(12) United States Patent
Seong et al.

(10) Patent No.: US 10,318,853 B2
(45) Date of Patent: Jun. 11, 2019

(54) ANTENNA MODULE AND PORTABLE TERMINAL HAVING SAME

(71) Applicant: EMW CO., LTD., Incheon (KR)

(72) Inventors: Won Mo Seong, Gyeonggi-do (KR); Jung Han Oh, Gyeonggi-do (KR)

(73) Assignee: EMW CO., LTD., Incheon (KR)

( * ) Notice: Subject to any disclaimer, the term of this patent is extended or adjusted under 35 U.S.C. 154(b) by 0 days.

(21) Appl. No.: 15/757,434

(22) PCT Filed: Mar. 30, 2016

(86) PCT No.: PCT/KR2016/003289
§ 371 (c)(1),
(2) Date: Mar. 5, 2018

(87) PCT Pub. No.: WO2017/047891
PCT Pub. Date: Mar. 23, 2017

(65) Prior Publication Data
US 2018/0247173 A1    Aug. 30, 2018

(30) Foreign Application Priority Data

Sep. 18, 2015  (KR) .................. 10-2015-0132184

(51) Int. Cl.
*G06K 21/06*  (2006.01)
*G06K 19/07*  (2006.01)
(Continued)

(52) U.S. Cl.
CPC ... *G06K 19/0723* (2013.01); *G06K 19/07773* (2013.01); *H01Q 1/38* (2013.01);
(Continued)

(58) Field of Classification Search
CPC ............ G06K 19/07749; G07F 7/1008; G06Q 20/341
(Continued)

(56) References Cited

U.S. PATENT DOCUMENTS

2013/0127573 A1* 5/2013 Nakano .............. G06K 7/10009
336/115
2017/0317405 A1* 11/2017 Han ..................... H04B 5/0087
2017/0341341 A1* 11/2017 Kim ........................ B32B 7/12

FOREIGN PATENT DOCUMENTS

JP       2007-094563 A    4/2007
KR  10-2007-0054356 A    5/2007
(Continued)

OTHER PUBLICATIONS

International Search Report for PCT/KR2016/003289.

*Primary Examiner* — Ashik Kim
(74) *Attorney, Agent, or Firm* — The PL Law Group, PLLC

(57) ABSTRACT

An antenna module includes a magnetic body portion made of a ferrite sheet, a first pattern portion directly formed on one surface of the magnetic body portion and including a first pattern and a first plating layer stacked thereon, a second pattern portion directly formed on the other surface of the magnetic body portion and including a second pattern and a second plating layer stacked thereon, and a via hole formed through the magnetic body portion and having a connection member for electrically connecting the first pattern portion and the second pattern portion formed therein. The first pattern portion and the second pattern portion are formed directly on the magnetic body portion without a substrate portion. Thus, the thickness is reduced by the amount of the thickness of the substrate portion.

8 Claims, 4 Drawing Sheets

(51) Int. Cl.
*G06K 19/077* (2006.01)
*H01Q 1/38* (2006.01)
*H01Q 7/06* (2006.01)
*H04B 5/00* (2006.01)
*H04B 7/06* (2006.01)

(52) U.S. Cl.
CPC ............... *H01Q 7/06* (2013.01); *H04B 5/00* (2013.01); *H04B 5/0081* (2013.01); *H04B 7/0613* (2013.01); *G06K 19/07783* (2013.01)

(58) Field of Classification Search
USPC ........................................................ 235/492
See application file for complete search history.

(56) References Cited

FOREIGN PATENT DOCUMENTS

| KR | 10-2007-0113770 A | 11/2007 |
| KR | 10-2012-0029713 A | 3/2012 |
| KR | 10-2012-0130637 A | 12/2012 |

\* cited by examiner

ANTENNA MODULE AND PORTABLE TERMINAL HAVING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/003289, filed Mar. 30, 2016, which claims priority to the benefit of Korean Patent Application No. 10-2015-0132184 filed in the Korean Intellectual Property Office on Sep. 18, 2015, the entire contents of which are incorporated herein by reference.

TECHNICAL FIELD

The present invention relates to an antenna module and a portable terminal having the same, and more particularly, to an antenna module in which first and second pattern portions are directly formed on both surfaces of a ferrite sheet and are electrically connected by a connection member such that the first and second pattern portions may be directly formed on the ferrite sheet without a substrate portion and a thickness of the antenna module is thus reduced by a thickness of the substrate portion, and a portable terminal having the same.

BACKGROUND ART

Generally, a near field communication (NFC) technology is a non-contact type near-field wireless communication technology capable of transmitting data at low power in a short range using radio frequency identification (RFID) technology in which a frequency band of 13.56 MHz is used, and the NFC technology is stipulated as the ISO 18092 standard. Further, the NFC technology can perform near-field wireless communication using signals of various frequencies including 125 MHz, 135 MHz, and 900 MHz in addition to the frequency of 13.56 MHz.

As one example of application of such an NFC technology, an NFC module includes a terminal having a tag and a reader configured to read data from the tag of the terminal or upload new data thereto by generating a radio wave in proximity to the terminal, and the NFC module is employed in transportation card payment systems, food price settlement systems, and the like.

Recently, as the use of an intelligent mobile terminals, such as smart phones, and tablet PCs have become common, various applications dedicated to mobile devices have been introduced so as to provide a variety of new services to users, and some kinds of the applications require interlocking with the NFC technology. For example, service of an electronic payment system may be provided through interlocking of an application of a smart phone with the NFC technology.

Further, a wireless charging technique, which is getting attention in recent years, allows charging of a portable terminal by being placed on or disposed near a charger without directly connecting a connector of the charger to a connector of the portable terminal. This charging is performed by an electromagnetic induction method in which an induced current is generated between two adjacently disposed coil patterns.

An NFC antenna module and a wireless charging antenna module, which realize the NFC technology and the wireless charging as described above, are formed by a bonding of a flexible printed circuit board (FPCB) 10 and a ferrite sheet 20 as shown in FIG. 1.

At this point, a pattern 11 is formed on the FPCB 10, and in the case of the NFC antenna module, the pattern 11 is used as a radiator for a near-field communication, and in the case of the wireless charging antenna module, the pattern 11 is used as a coil for generating an induced current.

In the conventional NFC antenna module and the conventional wireless charging antenna module as described above, since the pattern 11 is formed on the FPCB 10, a thickness of each of the modules tends to be thicker by a thickness of the FPCB 10.

Accordingly, there is a problem in that a thickness of a portable terminal having the NFC antenna module and the wireless charging antenna module therein also increases.

SUMMARY

To resolve the above-described problem, an objective of the present invention is to provide an antenna module in which first and second pattern portions are directly formed on both surfaces of a ferrite sheet and are electrically connected by a connection member such that the first and second pattern portions may be directly formed on the ferrite sheet without a substrate portion and a thickness of the antenna module is thus reduced by a thickness of the substrate portion, and a portable terminal having the same.

It is an objective of the present invention to provide an antenna module including a magnetic body portion made of a ferrite sheet; a first pattern portion directly formed on one surface of the magnetic body portion and made by stacking a first pattern and a first plating layer; a second pattern portion directly formed on the other surface of the magnetic body portion and made by stacking a second pattern and a second plating layer; and a via hole formed to pass through the magnetic body portion and provided therein with a connection member formed to electrically connect the first pattern portion and the second pattern portion, wherein the first pattern portion and the second pattern portion are directly formed on the magnetic body portion without a substrate portion.

The first pattern portion and the second pattern portion may be formed to have different thicknesses.

The first plating layer and the second plating layer may have different thicknesses.

The first pattern and the second pattern may have different thicknesses.

The connection member may be formed by plating.

Also, the first pattern portion and the second pattern portion may be formed to have different widths.

Meanwhile, a portable terminal according to the present invention includes an antenna module having a magnetic body portion made of a ferrite sheet, a first pattern portion and a second pattern portion attached to both surfaces of the magnetic body portion, a via hole formed to sequentially pass through the first pattern portion, the magnetic body portion, and the second pattern portion, and a connection member formed inside the via hole and configured to electrically connect the first and second pattern portions to each other; and a substrate provided with a power feeding portion and a grounding portion, electrically connected to the antenna module, and configured to feed power to or ground the first pattern portion or the second pattern portion.

Therefore, the present invention has the following effects.

First, first and second pattern portions are directly formed on both surfaces of a ferrite sheet and are electrically connected by a connection member, and thus the first and second pattern portions can be directly formed on the ferrite sheet without a substrate portion such that there is an effect in that a thickness is reduced by a thickness of the substrate portion.

Second, first and second pattern portions are formed to have different thicknesses by adjusting thicknesses of first and second plating layers of the first and second pattern portions such that there is an effect in that radiation efficiency or charging efficiency of an antenna module can be increased.

DETAILED DESCRIPTION

Terms and words used in the present invention and the appended claims should not be construed to limit to ordinary or dictionary terms, and according to the principle in that the inventor shall appropriately define the concept of the term in order to describe his or her invention in a best manner, the terms and words should be construed as the meaning and concept consistent with the technical spirit of the present invention.

Therefore, embodiments described herein and configurations shown in the accompanying drawings are merely most preferred embodiments of the present invention, and do not represent all the technical spirit of the present invention, and therefore, it should be understood that various equivalents and modifications replacing the embodiments and the configuration may be present at the time of filing the present invention. In the following description, when it is determined that a known related art or the like may obscure the gist of the present invention, a detailed description thereof will be omitted.

Hereinafter, an antenna module according to exemplary embodiments of the present invention and a portable terminal having the same will be described with reference to the accompanying drawings.

Figure 1:
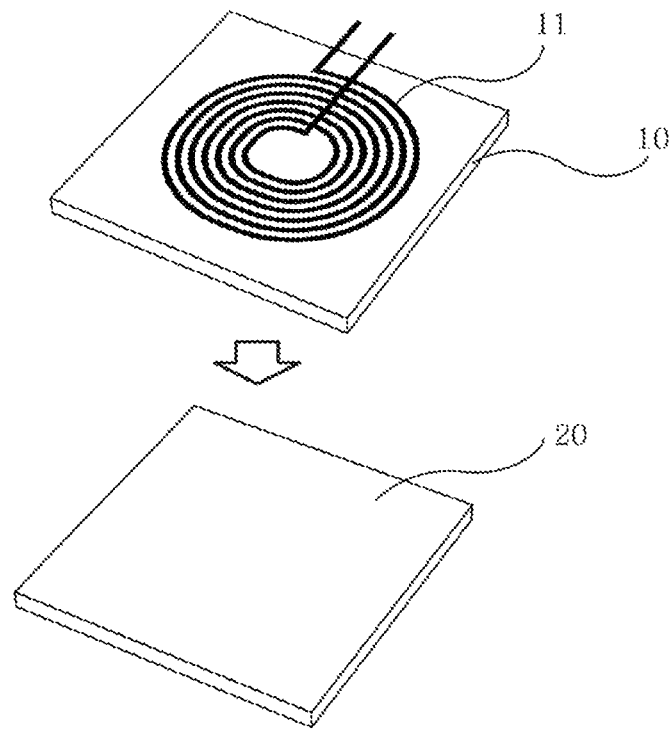
FIG. 1 is a diagram of a conventional antenna module.
Figure 2:
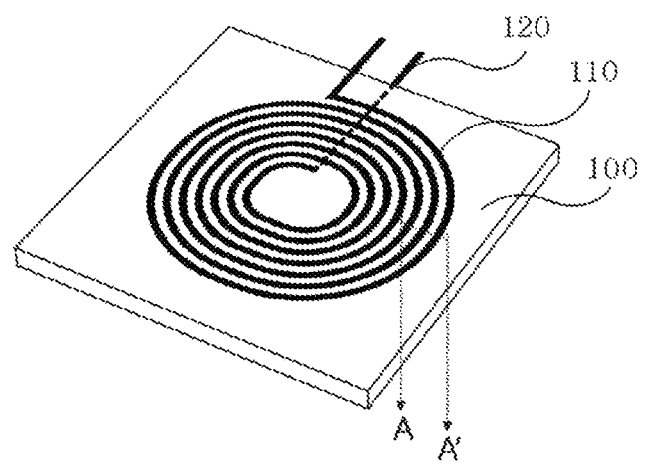
FIG. 2 is a perspective view of an antenna module according to the present invention.
Figure 3:
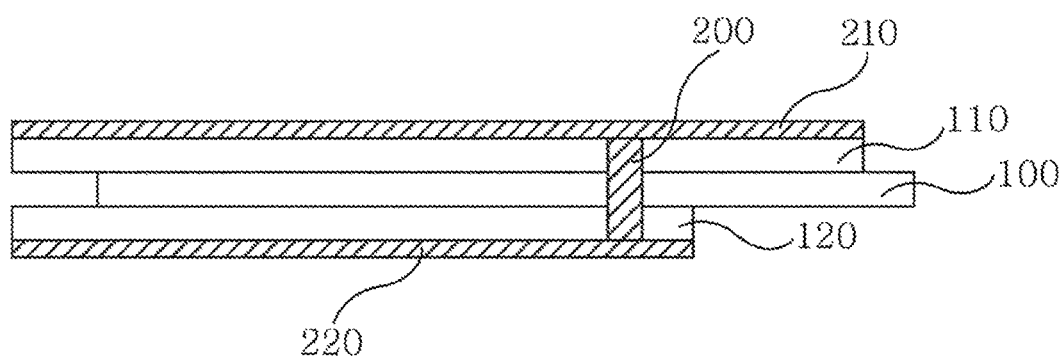
FIG. 3 is a cross-sectional view of the antenna module according to the present invention.

As shown in FIGS. 2 and 3, the antenna module according to the present invention includes a magnetic body portion 100 formed of a ferrite sheet, a first pattern portion directly formed on one surface of the magnetic body portion 100 and formed by stacking a first pattern 110 and a first plating layer 210, a second pattern portion directly formed on the other surface of the magnetic body portion 100 and formed by stacking a second pattern 120 and a second plating layer 220, and a via hole formed to pass through the magnetic body portion 100 and provided therein with a connection member 200 formed to electrically connect the first pattern portion and the second pattern portion.

First, the magnetic body portion 100 is provided in a sheet form having a predetermined thickness and made of a ferrite material, and the magnetic body portion 100 serves to block electromagnetic waves. The magnetic body portion 100 is manufactured such that a ferrite powder is sintered and formed into a sheet, and then the sheet is cut into an appropriate size.

The first pattern portion is formed by stacking a first pattern 110 and a first plating layer 210. The first pattern 110 is a thin metal film having a predetermined thickness and is formed in a predetermined pattern shape such as a loop shape and is directly formed on one surface of the magnetic body portion 100. The first pattern 110 may be formed in a predetermined shape and then directly formed on one surface of the magnetic body portion 100, and alternatively, the first pattern 110 may be formed by attaching a thin film to one surface of the magnetic body portion 100 and then removing a portion of the thin film by etching. The first pattern 110 may be formed of a thin film made of a copper material. At this point, one end portion of the first pattern 110 is formed to extend toward an edge side of the magnetic body portion 100 such that a portion of the one end portion is formed to be exposed to the outside of the magnetic body portion 100 to form a terminal.

Further, the first plating layer 210 is a layer stacked on an outer surface of the first pattern 110, that is, a surface opposite a surface of the first pattern 110 attached to the magnetic body portion 100, and the first plating layer 210 is formed by plating. At this point, the first plating layer 210 may be formed by plating a copper material.

Meanwhile, the second pattern portion is formed by stacking the second pattern 120 and the second plating layer 220.

The second pattern 120 is a thin film made of a metal material and having a predetermined thickness, and the second pattern 120 is formed in a predetermined pattern shape, for example, a rectangular shape, and is directly formed on the other surface of the magnetic body portion 100. The second pattern 120 may be formed in a predetermined shape and then directly formed on the other surface of the magnetic body portion 100, and alternatively, the second pattern 120 may be formed by attaching a thin film to the other surface of the magnetic body portion 100 and then removing a portion of the thin film by etching. The second pattern 120 may be formed of a thin film made of a copper material. At this point, one end portion of the second pattern 120 is formed to extend toward an edge side of the magnetic body portion 100 such that a portion of the one end portion is formed to be exposed to the outside of the magnetic body portion 100 to form a terminal.

Further, the second plating layer 220 is a layer stacked on an outer surface of the second pattern 120, that is, a surface opposite a surface of the second pattern 120 attached to the magnetic body portion 100, and the second plating layer 220 is formed by plating. At this point, the second plating layer 220 may be formed by plating a copper material.

At this point, as shown in FIG. 3, the first pattern portion and the second pattern portion may be formed to have the same thickness. More specifically, the first pattern 110 and the second pattern 120 may be formed to have the same thickness, and the first plating layer 210 and the second plating layer 220 may be formed to have the same thickness.

Further, the first pattern portion and the second pattern portion may be formed to have the same width (span) or different widths (spans). However, the first pattern portion and the second pattern portion may be more preferred to have different widths. This will be described below with reference to the drawings.

Further, the via hole is a hole sequentially passing through the first pattern portion, the magnetic body portion 100, and the second pattern portion, and the via hole is formed to pass through the other end portion of the first pattern 110 and the other end portion of the second pattern 120. At this point, the connection member 200 is formed inside the via hole to electrically connect the first pattern 110 of the first pattern portion and the second pattern 120 of the second pattern portion. The connection member 200 is formed such that the antenna module is immersed in a plating bath to plate a copper material on the via hole. The first plating layer 210 and the second plating layer 220 may also be formed such that the antenna module is immersed in the plating bath to perform plating.

Figure 4:
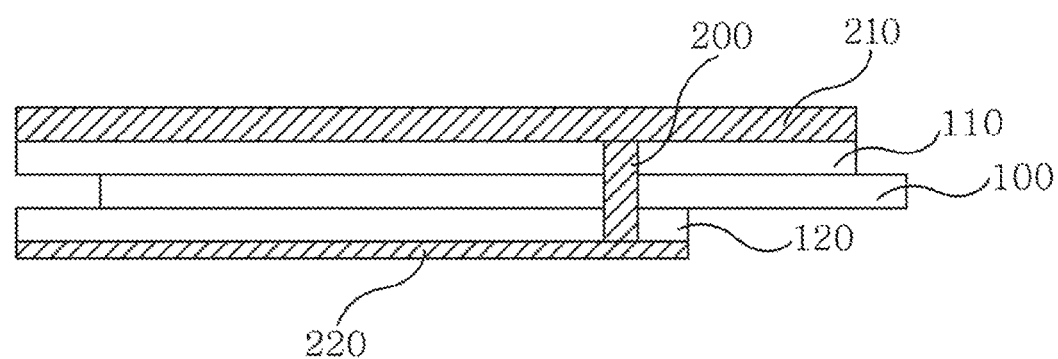
FIG. 4 is a cross-sectional view of an antenna module according to another embodiment of the present invention.

Meanwhile, as shown in FIG. 4, the first pattern portion and the second pattern portion may be formed to have different thicknesses. At this point, the first pattern 110 and the second pattern 120 are formed to have the same thickness, and the first plating layer 210 and the second plating layer 220 are formed to have different thicknesses such that the first pattern portion and the second pattern portion may have different thicknesses. For example, when the first plating layer 210 is formed to be thicker than the second plating layer 220, the thickness of the first pattern portion is increased such that radiation efficiency or wireless charging efficiency is increased. That is, the thicknesses of the first pattern portion and the second pattern portion may be controlled as necessary by adjusting the thicknesses of the first plating layer 210 and the second plating layer 220.

Meanwhile, as described above, the first pattern portion and the second pattern portion may be configured to have different widths.

Figure 5:
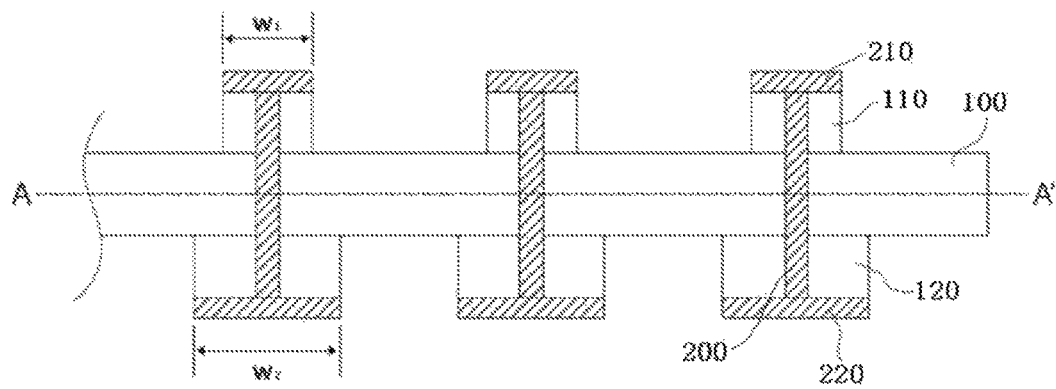
FIG. 5 is a partial cross-sectional view taken along line A-A' in FIG. 2.
Figure 6:
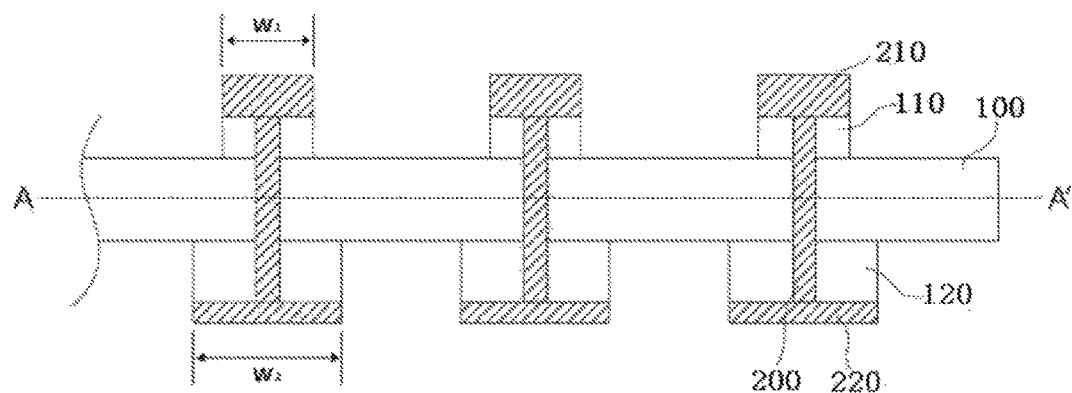
FIG. 6 is a partial cross-sectional view taken along line A-A' in FIG. 2 in another embodiment.

For example, as shown in FIGS. 5 and 6, a width W2 of the second pattern portion including the second pattern 120 and the second plating layer 220 may be formed to be wider than a width W1 of the first pattern portion including the first pattern 110 and the first plating layer 210. However, in FIGS. 5 and 6, the width W2 of the second pattern portion has been shown to be wider than the width W1 of the first pattern portion, but the present invention is not limited thereto.

When a pattern region is formed to have a wider width, a cross-sectional area of a circuit can be widened to reduce circuit resistance such that efficiency of an entire circuit can be improved. Further, since expansion in a thickness direction is not required to widen the cross-sectional area of the circuit, there is an advantage in that a product can be made in a small size.

At this point, the first plating layer 210 and the second plating layer 220 may be formed to have the same thickness as shown in FIG. 5, and alternatively, the first plating layer 210 and the second plating layer 220 may be formed to have different thicknesses as shown in FIG. 6, such that the first pattern portion and the second pattern portion may have different thicknesses.

According to the antenna module of the present invention configured as described above, since the first pattern portion and the second pattern portion are formed on both of the surfaces of the magnetic body portion 100 and are connected by the connection member 200, the terminals extending from the first pattern portion and the second pattern portion are not in contact with each other and thus an electrical short circuit can be prevented.

Meanwhile, the portable terminal according to the present invention includes an antenna module having a ferrite sheet, first and second pattern portions attached to both surfaces of the ferrite sheet, a via hole formed to sequentially pass through the first pattern portion, the ferrite sheet, and the second pattern portion, and a connection member formed inside the via hole and configured to electrically connect the first and second pattern portions to each other, and a substrate provided with a power feeding portion and a grounding portion, electrically connected to the antenna module, and configured to feed power to or ground the first pattern portion or the second pattern portion.

The antenna module has been described above in detail, and thus a description thereof will be omitted.

The substrate is provided as a PCB or the like which is generally used in a portable terminal and allows the power feeding portion and the grounding portion to be electrically connected to the antenna module, thereby operating the antenna module.

As described above, the antenna module installed inside the portable terminal serves as an antenna for performing near field communication or wireless charging according to the purpose of use.

According to the antenna module and the portable terminal having the same which are configured as described above, the first and second pattern portions are directly formed on both of the surfaces of the ferrite sheet and are electrically connected by the connection member, and thus the first and second pattern portions may be directly formed on the ferrite sheet without a substrate portion such that there is an effect in that thicknesses of the antenna module and the portable terminal are reduced by the thickness of the substrate portion.

Further, the first and second pattern portions are formed to have different thicknesses by adjusting thicknesses of first and second plating layers of the first and second pattern portions such that there is an effect in that radiation efficiency or charging efficiency of an antenna module can be increased.

Hereinbefore, the exemplary embodiments of the antenna module and the portable terminal having the same according to the present invention have been described.

It should be understood that the above-described embodiments are illustrative in all aspects and not restrictive, and the scope of the present invention will be defined by the appended claims rather than by the above detailed description. Further, it should be construed that the meaning and scope of the appended claims, and as well as alternations and modifications derived from equivalence of the appended claims will fall within the scope of the present invention.

The invention claimed is:

1. An antenna module comprising:
   a magnetic body portion made of a ferrite sheet;
   a first pattern portion directly formed on one surface of the magnetic body portion and made by stacking a first pattern and a first plating layer;
   a second pattern portion directly formed on the other surface of the magnetic body portion and made by stacking a second pattern and a second plating layer; and
   a via hole formed to pass through the magnetic body portion and provided therein with a connection member formed to electrically connect the first pattern portion and the second pattern portion,
   wherein the first pattern portion and the second pattern portion are directly formed on the magnetic body portion without a substrate portion.

2. The antenna module of claim 1, wherein the first pattern portion and the second pattern portion are formed to have different thicknesses.

3. The antenna module of claim 2, wherein the first plating layer and the second plating layer have different thicknesses.

4. The antenna module of claim 2, wherein the first pattern and the second pattern have the same thickness.

5. The antenna module of claim 1, wherein the connection member is formed by plating.

6. The antenna module of claim 1, wherein the first pattern portion and the second pattern portion are formed to have different widths.

7. The antenna module of claim 2, wherein the first pattern portion and the second pattern portion are formed to have different widths.

8. A portable terminal comprising:
- an antenna module including a magnetic body portion made of a ferrite sheet, a first pattern portion and a second pattern portion attached to both surfaces of the magnetic body portion, a via hole formed to sequentially pass through the first pattern portion, the magnetic body portion, and the second pattern portion, and a connection member formed inside the via hole and configured to electrically connect the first and second pattern portions to each other; and
- a substrate provided with a power feeding portion and a grounding portion, electrically connected to the antenna module, and configured to feed power to or ground the first pattern portion or the second pattern portion.

\* \* \* \* \*